United States Patent Office 3,231,984
Patented Feb. 1, 1966

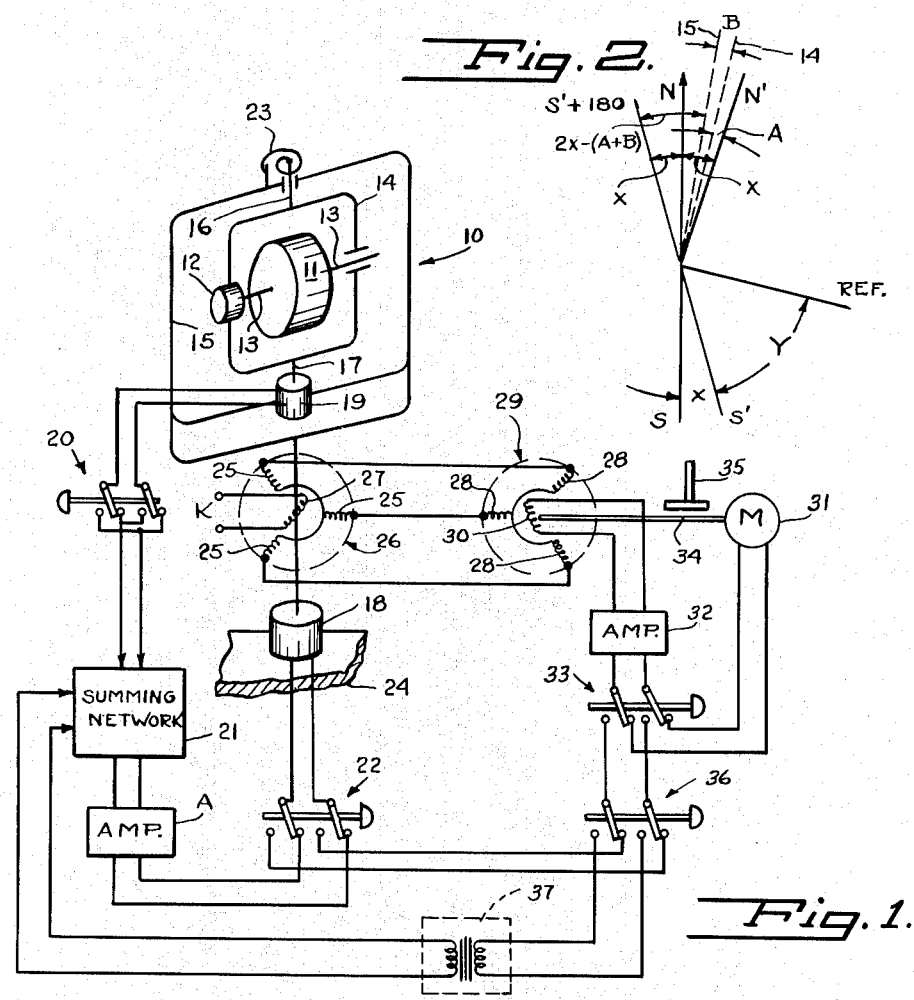

3,231,984
AUTOMATIC NORTH SEEKING RATE GYRO COMPASS
Edwin W. Howe, North Baldwin, and Irwin M. Feldman, Forest Hills, N.Y., assignors to American Bosch Arma Corporation, a corporation of New York
Filed Oct. 18, 1961, Ser. No. 145,909
5 Claims. (Cl. 33—226)

The present invention relates to land based azimuth reference devices and is particularly related to single degree of freedom gyroscopes used as directional compasses.

A single degree of freedom rate gyroscope which is mounted with its input axis horizontal and its output axis vertical is capable of indicating the meridian. The gyro seeks the position where its input axis is aligned with the axis of zero rate of turn and since the earth's rate about the east west horizontal axis is zero, the spin axis will settle on the meridian. If the gyro is imperfect a certain drift rate is inherent in the gyro and the input axis will seek a position where the drift rate is equal and opposite to the earth's rate, so that the spin axis of the gyro will come to rest displaced by a small error angle from the meridian. In an effort to compensate for these inherent gyro errors and to define the meridian more precisely and to reduce the error to zero, the gyro compass is adapted to first settle on the meridian in a south seeking mode and later in north seeking mode. The average position is taken as the true meridian. This is based on the assumption that the drift rate of the gyro remains constant in the two operating modes. Prior instruments using this system of compensation have depended entirely on manual control and mental calculations to obtain the desired average position and have not had the automatic features of this invention. These automatic features are designed to improve the accuracy of the instrument and to facilitate the use of the device.

In this invention, the gyro is initially operated in a south seeking mode. The orientation of the gyro in this mode with respect to a fixed reference is memorized. The gyro is then slewed to a position 180° away from the memorized position and from there it is allowed to settle in its north seeking mode.

Subsequently, the difference between (1) an angle proportional to the angle between the follow-up gimbal frame and the memorized position 180° away from the nulled position in the south seeking mode and (2) the angle between the follow-up frame and the gyro spin axis is obtained. It can be shown that the angle between the gyro spin axis and the follow-up frame is proportional to the angle between the follow-up frame and the settled position of the gyro in the north seeking mode. Therefore, if the difference obtained above is used to drive the follow-up frame so as to reduce the error to zero, with proper scaling the system can be made to come to rest in the position where the angle between the memorized position plus 180° and the north seeking settled position is bisected by the follow-up frame, whence the frame comes to rest in the true meridian.

For a more complete understanding of the invention, reference may be had to the accompanying diagrams in which—

FIGURE 1 is a combined mechanical and electrical schematic sketch of the invention, and FIGURE 2 explains the geometry involved, and FIGURE 3 illustrates a possible modification of FIGURE 1.

With reference now to FIGURE 1, the single degree of freedom rate gyro 10 includes a spinning wheel 11 which is driven by electrical motor 12 and is supported by horizontal shafts 13, 13 in a vertical frame 14. The vertical frame 14 is supported for rotation in the follow-up frame 15 by vertical shafts 16, 17. Follow-up frame 15 is normally kept coplanar with gimbal frame 14 by the action of follow-up motor 18 which is energized according to the error signal developed in pickoff 19 located between shaft 17 and frame 15. The output of pickoff 19 is fed to motor 18 through a reversing switch 20, summing network 21, whose purpose will be described, an amplifier A and a switch 22.

Spring means 23 between shaft 16 and gimbal frame 15 acts to apply a torque to gyro wheel 11 upon relative angular displacement between the follow-up frame 15 and frame 14. It is now well known that a rate gyro can be made to approach the meridian and settle thereon to a high degree of accuracy, with an error arising as a result of the drift of the gyro. In a special technique to improve the accuracy, it is proposed to operate the gyro in two modes—south spinning to settle with the spin vector pointing south and north spinning to settle with the spin vector pointing north. The true meridian lies midway between the final position of the spin axis in the two modes. The present invention automatically determines this mid-point position and causes the follow-up frame of the gyro to settle thereon.

The gyro is mounted on a horizontal platform 24 and is initially oriented so that its spin axis is approximately on the meridian, with its spin vector directed south. From this position, the gyro will be caused to seek, and settle on, the meridian in the following manner: If the spin axis is not directly on the meridian, the earth's rotation applies a horizontal torque to the gyro which causes a precession of the spin axis further away from the meridian, and creates an angular displacement between the frames 14 and 15. This angular displacement causes a torque about the vertical axis due to springs 23 which causes the gyro to precess about the horizontal in the same direction that the frame 14 is moved due to the earth's rotation. If the angle were such that the rate of precession was equal to the component of the earth's rate about the axis of precession, a fixed displacement between frames 14 and 15 would be established. However, the angular displacement creates a signal in pickoff 19 which is reversed in switch 20 and which energizes motor 18, so as to drive the frame 15 towards the meridian, thereby increasing the angular displacement between frames 14, 15 rather than driving frame 15 into coincidence with frame 14. The increased angular displacement which results applies a greater vertical torque to gyro 11 and causes the wheel 11 to follow the frame 15 to the meridian. In the settled condition, the spin axis of the gyro 11 is aligned with frame 15 and is aligned with the meridian, if the gyro is perfect. Ordinarily, gyro drift causes the gyro to settle on an apparent meridian which is displaced from the true meridian by a small error angle. It will be seen that in the operation above described the motor 18 response to pickoff 19 error should be slower than the precessional response of the gyro 11 to the restoring torque of the spring 23 for stability.

In the operation just described, the gyro wheel 11 is set spinning in the south spinning direction and through rate gyro compass action, the spin axis settles on the S' meridian (FIG. 2) with the spin vector pointing south at an angle Y measured from the reference index R on platform 24, and at an angle X from the true meridian S. Assuming the horizontal platform 24 to be mounted on a steady support, signals indicative of the south direction relative to a fixed reference R on the platform 24 will be generated in stator windings 25 of a synchro type generator 26. The rotor winding 27 of the synchro generator 26 is energized by a constant alternating voltage K and is displaced by follow-up motor 18 relatively to the stator windings 25 which are fixed to the platform 24. The S' directional signals generated in stator windings 25 are fed to the multiple stator windings 28 of control transformer 29, the single rotor winding 30 of which is connected to the control circuit of motor 31 through amplifier 32 and selector switch 33. Motor 31 drives the shaft 34 and thereby drives winding 30 until the winding 30 is positioned normal to the field of windings 28, whence the output of winding 30 is zero and motor 31 is deenergized.

After the gyro 10 has settled in the south spinning direction with the follow-up frame 15 and the spin axis of gyro wheel 11 directed along S', and motor 31 has driven winding 30 to the null position, the winding 30 is locked in position by applying a brake 35 to shaft 34. Switches 22 and 33 are then operated to the left in FIGURE 1 thereby applying the output of winding 30 (through switches 33, 36 and 22) to the control circuit of motor 18. The connections through switch 33 effectively reverse the signal to motor 18 so that motor 18 is in an unstable null condition which will cause the motor to drive the rotor winding 27 of generator 26 to a position 180° away from its S' position thereby driving frame 15 to the $S'+180°$ position. Spring connection 23 applies a torque to frame 14 and the resulting reaction of gyro 11 against its bearings in frame 14 causes the gyroscope to precess about the vertical and to drive frame 14 to follow frame 15 to the $S'+180°$ position.

Now when switch 22 is returned to the right in FIGURE 1 and the response of motor 18 to the output of pickoff 19 is returned to normal by switch 20, so that gimbal frame 15 is driven into coincidence with frame 14, the gyro 11 will settle with its spin vector pointing to an apparent meridian N' which is also displaced from the true meridian by the same angle X. In this position the frame 14 is rotating about a horizontal axis due to the earth's rotation at a rate equal to the rate of precession of the gyro due to the errors of the gyro so that there is no reaction at the gyro spin bearings, the rotor 30 remaining in the position corresponding to $S'+180°$. The true meridian N lies midway between $S'+180°$ and N'.

In order to bring the follow-up frame 15 to the true meridian N, switch 36 is now operated to the left in FIGURE 1, leaving switch 22 to the right and switch 33 to the left.

Now, the signal from winding 30 is combined with the signal from pickoff 19 in the summing network 21, and the combined signal is applied to motor 18. The combined signal causes the motor 18 to rotate the frame 15 away from the N' position toward the true meridian N simultaneously reducing the signal from winding 30. However, the displacement of frame 15 from frame 14 also applies a torque to gyro wheel 11 through spring 23 which tends to make the gyro 11 precess about the horizontal axis, but the reaction of frame 14 actually causes the gyro to follow frame 15 to a new position.

The gyro reaches an equilibrium when the rate of precession of the gyro due to the torque applied by spring 23 is equal and opposite to the rate of precession of the gyro due to its displacement from the apparent meridian N'. If the angle through which the spring 23 is stressed is B and the angle between the spin axis and N' is A, it will be seen that angle A is proportional to angle B whence the sum $(A+B)$, being proportional to B, may be expressed as KB.

The output of control transformer 29 is proportional to the angular deviation between the follow-up frame 15 and the $S'+180°$ position, $2x-(A+B)$ or $2x-KB$. Matching a portion of the output of control transformer 29, $k(2x-KB)$, against the output of pickoff 19, B, and driving the error to zero results in the relationship $$k(2x-KB)=B \quad (1)$$

whence $$2kx-kKB=B \quad (2)$$

and $$\frac{2k}{1+kK}x=B \quad (3)$$

In order to halve the angle $2x$ whereby $x=A+B$, or $x=KB$, $$\frac{2k}{1+kK}KB=B \quad (4)$$

and solving for $k$, $$2kK=1+kK \quad (5)$$

$$kK=1 \quad (6)$$

$$k=\frac{1}{K} \quad (7)$$

Thus, when the scaled output of winding 30 is matched by the pickoff 19 output the signal to motor 18 will be zero and the gyro will come to rest. If the scaling is correctly chosen, the gyro will come to rest with the follow-up frame 15 on the meridian although the gyro spin axis will be slightly displaced therefrom. If the scaling is not correct, the follow-up frame will come to rest at some position between the true meridian and the apparent meridian N'.

The switches 22, 33 and 36 are preferably automatically controlled to perform the sequence of switching just described in order to make the complete operation automatic without need for manual assistance, it being understood that operation of brake 35 is merely a safety feature not necessary in automatic operation since the shaft of motor 31 is arrested by the normal operation of the system without requiring braking. There are four conditions of switches which can be tabulated as follows:

| Switch | South Seeking Compass | Slew North | North Seeking Compass | Average Position |
|---|---|---|---|---|
| 22 | R | L | R | R |
| 33 | R | L | L | L |
| 36 | R | R | R | L |
| 20 | R | — | L | L | where $R=$ to the right and $L=$ to the left in FIGURE 1. Switches 22, 33, 36 and 20, therefore, can be time controlled switches allowing enough time between switching for each condition to stabilize. FIGURE 3 shows a possible time controlled switching means, where a motor 47 drives four cams 41, 42, 43 and 51. At selected times the four conditions of the table are satisfied in sequence as the cam followers 44, 45, 46 and 52 operate the relay controlled switches 22, 33, 36 and 20. Cams 41, 42, 43 and 51 are driven by motor 47 upon closure of switch 48. Preferably the motor is controlled so as to drive the cams 41–43 and 51 through one cycle only. This may be accomplished by the notched disc 49 and switch 50 which shunts the momentary contact switch 48. When the cams and disc 49 have been rotated through one cycle, the switch 50 is opposite the notch and is opened to deenergize the motor 47. The foregoing is merely illustrative of one possible means for automation of the compass and many others will occur to those in the art.

Alternatively, the completion of the operation in one condition may be used to trigger the start of the next condition. For example, with the switches in the first state, the operation is completed when the signal from pickoff 19 and the output of winding 30 are zero. The second condition is completed when the output of network 21 is zero. The third condition is completed when the pickoff 19 output becomes zero and the final condition is completed when output of summing network 21 is zero. The automatic switching may be arranged through relays or electronic switching devices by techniques now well known in the art which will require no further discussion here.

It will be seen that in practice the third step can be eliminated since at the 180° slewed position the gyro is stable in the north seeking condition and will come to rest with the follow-up frame on the meridian, without the necessity of being driven to the apparent meridian and then returned to the true meridian.

We claim:
1. In a device of the character described, a single degree of freedom rate gyroscope having a follow-up frame, an input and an output axis, and adapted to be responsive to rotation about a horizontal axis and producing an output signal indicative of the rate thereof, a horizontal platform, motive means on said platform adapted to rotate said gyroscope about its output axis, means for generating positional signals indicative of the orientation of said follow-up frame with respect to a predetermined reference on said platform, receiving means energized by said positional signals and having an adjustable member, said receiving means producing an output signal indicative of the error between the position indicated by said positional signals and the actual position of said adjustable member, means for comparing the output of said gyroscope with the output of said receiving means, and switching means for selectively connecting said motive means to the output of said gyroscope, to the output of said receiving means or to the output of said comparing means.

2. In a device of the character described, a single degree of freedom rate gyroscope having a follow-up frame, an input and an output axis, and adapted to be responsive to rotation about a horizontal axis and producing an output signal indicative of the rate thereof, a horizontal platform, motive means on said platform adapted to rotate said gyroscope about its output axis, means for generating positional signals indicative of the orientation of said follow-up frame with respect to a predetermined reference on said platform, receiving means energized by said positional signals and having an adjustable member, said receiving means producing an output signal indicative of the error between the position indicated by said positional signals and the actual position of said adjustable member, means for comparing the output of said gyroscope with the output of said receiving means, and switching means for selectively connecting said motive means to the output of said gyroscope, to the output of said receiving means or to the output of said comparing means and means for reversing the output of said gyroscope.

3. In a device of the character described, a single degree of freedom rate gyroscope having a follow-up frame, an input and an output axis, and adapted to be responsive to rotation about a horizontal axis and producing an output signal indicative of the rate thereof, a horizontal platform, motive means on said platform adapted to rotate said gyroscope about its output axis, means for generating positional signals indicative of the orientation of said follow-up frame with respect to a predetermined reference on said platform, receiving means energized by said positional signals and having an adjustable member, said receiving means producing an output signal indicative of the error between the position indicated by said positional signals and the actual position of said adjustable member, means for comparing the output of said gyroscope with the output of said receiving means, and switching means for selectively connecting said motive means to the output of said gyroscope, to the output of said receiving means or to the output of said comparing means and means for reversing the output of said gyroscope, second motive means, second switching means, said second motive means being energized by the output of said receiving means through said second switching means and adapted to drive the adjustable member of said receiving means while said first motive means is connected to said gyroscope output and while said gyroscope output is reversed and said second switching means deenergizing said second motive means at all other times.

4. In a device of the character described, a single degree of freedom rate gyroscope, a horizontal platform, said gyroscope being mounted on said platform so that its spin axis is horizontal, the input axis is horizontal and the output axis is vertical, means for causing said gyro to reach a settled south seeking position, means for memorizing the direction of said south settled position, means for slewing said gyroscope to a position 180° away from said south settled position, means for causing said gyro to seek a north settled position from said slewed position and means for automatically causing said gyroscope to settle at a position midway between said south settled plus 180° position and said north settled position.

5. In a device of the character described, a single degree of freedom rate gyroscope, a horizontal platform, said gyroscope being mounted on said platform so that its spin axis is horizontal, the input axis is horizontal and the output axis is vertical, means for causing said gyro to reach a settled south seeking position, means for memorizing the direction of said south settled position, means for slewing said gyroscope to a position 180° away from said south settled position, means for causing said gyro to seek a north settled position from said slewed position and means for automatically causing said gyroscope to settle at a position midway between said south settled plus 180° position and said north settled position, said last named means including means for comparing the output of said gyroscope to a value proportional to the orientation of the gyroscope with respect to said memorized direction +180° to produce an error signal and means to reduce the error signal to zero by adjusting the position of said gyroscope.

References Cited by the Examiner

UNITED STATES PATENTS

| 2,637,914 | 5/1953 | Rawlings | 33—226 |
| 2,896,455 | 7/1959 | Bishop et al. | 33—226 X |
| 2,972,195 | 2/1961 | Campbell et al. | 33—226 |

FOREIGN PATENTS 962,669   7/1964   Great Britain.

ROBERT B. HULL, *Primary Examiner.*